Patented Jan. 13, 1925.

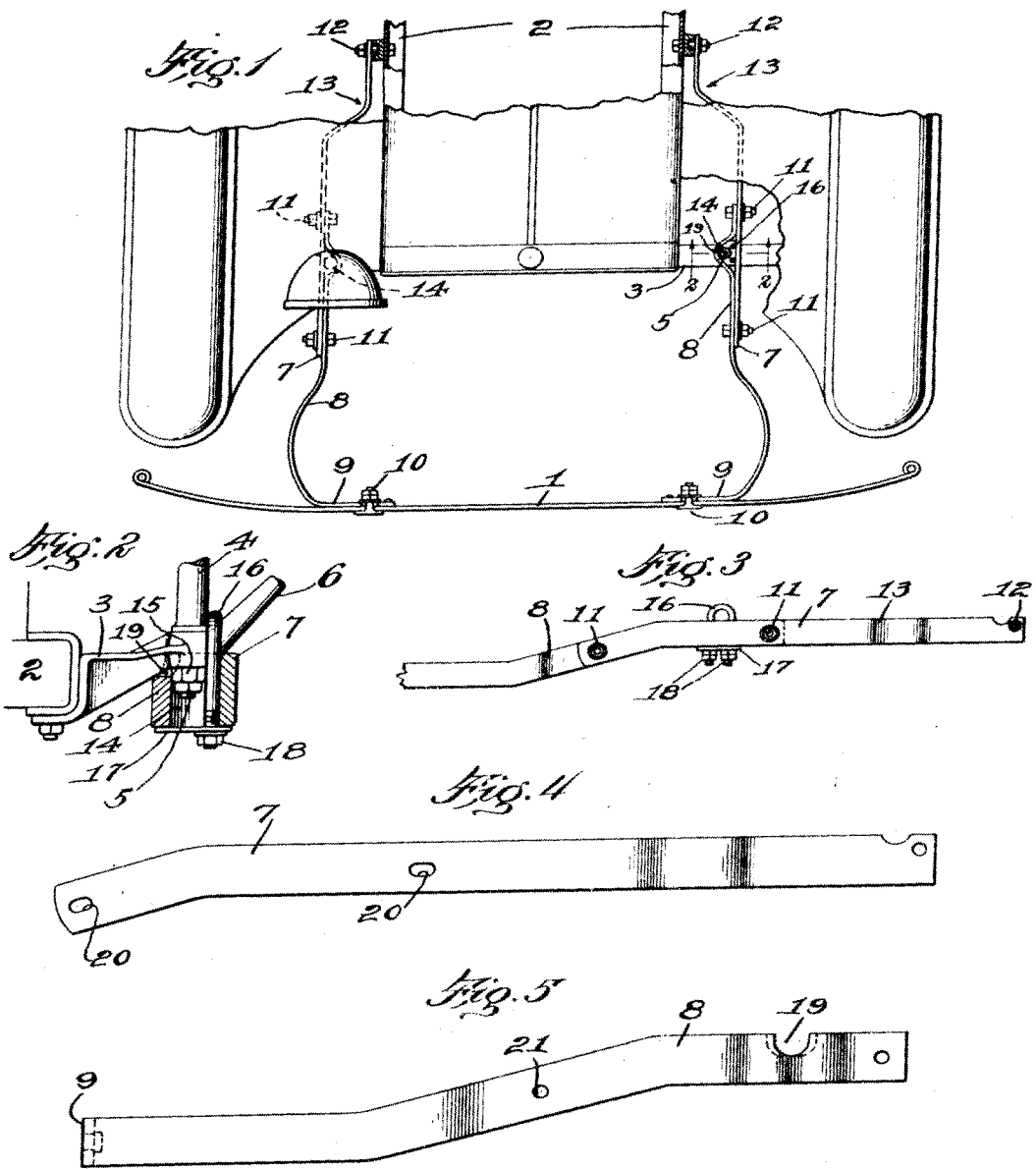

1,522,513

UNITED STATES PATENT OFFICE.

OSCAR H. GOETZ, OF BRIDGEPORT, CONNECTICUT, ASSIGNOR TO AMERICAN CHAIN COMPANY, INC., A CORPORATION OF NEW YORK.

AUTOMOBILE BUMPER BRACKET.

Application filed August 25, 1924. Serial No. 734,067.

*To all whom it may concern:*

Be it known that I, OSCAR H. GOETZ, a citizen of the United States, residing at Bridgeport, in the county of Fairfield, State of Connecticut, United States of America, have invented certain new and useful Improvements in Automobile Bumper Brackets, of which the following, taken in connection with the accompanying drawing, is a specification.

This invention relates to brackets for automobile-bumpers, and particularly for the type of automobile bumpers which derive their support partly from a connection with one or more of the conventional fender-and-lamp brackets upon automobiles of the standard Ford type, the primary object of my invention being to provide each side of the car with a bumper bracket having a simple and effective form of connection with the aforesaid fender-and-lamp bracket. This connection is formed as a loop between two overlapping bumper-bracket arms or members which are bolted together to embrace the downwardly extending portion of the lamp-post below the lamp-bracket.

The weight of the bracket members and of the bumper parts associated therewith is sustained by a U-bolt which straddles the fender arm and extends down through the loop, alongside of the lamp-post, being embraced therewith by the overlapping bracket arms, each U-bolt having a keeper-plate held in place by nuts screwed on the ends of the U-bolt.

Referring to the drawings:

Figure 1 is a fragmentary top view of the front of an automobile of the Ford type, showing the bumper attached.

Figure 2 is a view on a larger scale in section on the line 2—2 of Figure 1.

Figure 3 is an elevation of the left-hand bumper-arm, with its members assembled, but apart from the car.

Figures 4 and 5 are similar elevations on a larger scale of the bumper-bracket members, isolated respectively.

In the illustrated embodiment, the bumper 1 is shown in place upon the front of a standard Ford type automobile having channel frame members 2 provided with conventional fender-and-lamp brackets 3 through which extend the usual lamp-posts 4, these posts having threaded lower ends 5 projecting below the fender arms 6, and provided with the usual nuts 15.

The bumper comprises any suitable form of impact-receiving member or members, as for example that illustrated in Figure 1, which is shown as supported by bumper-bracket arms or members 7 and 8 arranged in assembled relation to form a bumper-bracket on each side of the front.

The outer ends 9 of the bracket members 8 are respectively connected to the member 1 in spaced relation by suitable means, being shown as secured thereto by clamps 10 which do not require particular description as the form of this connection is not essential to the invention. The bracket members 7 and 8 of each set are preferably brought together in overlapping relation substantially as illustrated, to embrace the lamp-post 5, and are joined together suitably, as by the bolts 11, one of these bracket-members being preferably provided with an offset portion to receive the lamp-post 5, in accordance with the invention, while the other bracket-member is preferably extended past the lamp-bracket, on the outside thereof, and is connected to the chassis at 12, constituting a stabilizer which may be advantageously offset at 13, so that the overlapping portions will be parallel with the frame members 2.

In the form illustrated, the bracket-member 8 on each side is selected as the one most convenient to provide with the improved connection for support of the bumper by the fender-bracket on each side of the car, on account of the advantage of space available, and in this form of connection the member 8 is provided with its offset loop 14 by bending its intermediate portion around inwardly into position to embrace the threaded portion of the lamp-post 4 and the nut or nuts 15 usually provided thereon.

I prefer to provide the loop of each member 8 with a notch on its upper edge, as at 19, to conform with the lower web of the bracket 3, so that lengthwise movement of the bumper-bracket arms is prevented entirely, by the engagement of the walls of the notch 19 with the bracket 3.

I prefer also to provide special means to hold the bumper-bracket members 7 and 8 in assembled relation, with, and sustained by, the fender-bracket, 3, and as a convenient form of means for this purpose I have shown a U-bolt having a body portion 16 to straddle the fender-arm 6 and extend down within the loop 14 of the bracket-member 8, alongside of the post 5, this U-bolt having a keeper-plate 17 fitted to its threaded legs, which are provided with nuts 18 serving to hold the keeper in place, and thus to sustain the weight of the bumper-bracket member 8 and its associated member 7 and the bumper 1.

The member 7 preferably has elongated holes 20 to permit adjustment of the bolts 11, which pass through the holes 20 and through the corresponding holes 21 in the member 8, so that in the installation of the bumper bracket upon the automobile there will be sufficient tolerance for variations in manufacture both of the car and brackets, even to the exaggerated degree indicated in Figure 1.

This attachment is cheap to manufacture, easy to install, and requires no structural alterations, nor substitutions of parts for the parts conventionally provided with standard Ford type cars. When the brackets have been secured in place by the U-bolts, maximum stability of the bumper is assured, for the U-bolts sustain the weight of the bumper 7, and the walls of the notches 19 prevent endwise displacement of the brackets under the stress of impacts against the bumper.

Having thus described my invention, I claim:

1. An automobile bumper-bracket of the type adapted to derive its support in part from a lamp-and-fender-bracket having a lamp-post extending downwardly therefrom, said bumper-bracket comprising a plurality of members assembled in overlapping relation to embrace said post, one of said bracket-members being offset to form a loop in said overlapping portion, to receive said post, and means to sustain the weight of said bumper-bracket from said fender-bracket.

2. An automobile bumper-bracket of the type adapted to derive its support in part from a lamp-and-fender-bracket having a lamp-post extending downwardly therefrom, said bumper-bracket comprising a plurality of members assembled in overlapping relation to embrace said post, one of said bracket-members being offset to form a loop in said overlapping portion, to receive said post, and a U-bolt arranged within said loop to straddle said fender-bracket and support said bumper-bracket.

3. An automobile bumper-bracket of the type adapted to derive its support in part from a lamp-and-fender-bracket having a lamp-post extending downwardly therefrom, said bumper-bracket comprising a plurality of members assembled in overlapping relation to embrace said post, one of said bracket members being offset to form a loop in said overlapping portion, to receive said post, and a U-bolt furnished with a keeper and having its legs threaded and provided with nuts to retain said keeper in place.

4. An automobile bumper-bracket of the type adapted to derive its support in part from a lamp-and-fender-bracket having a lamp-post extending downwardly therefrom, said bumper-bracket comprising a plurality of members assembled in overlapping relation to embrace said post, one of said bracket-members being offset to form a loop in said overlapping portion to receive said post, and a U-bolt arranged within said loop to straddle said fender-bracket, and having a keeper to sustain the weight of said bumper bracket and bumper, said U-bolt having its legs threaded and provided with nuts to retain said keeper in place; and said loop having its upper edge notched to receive a portion of said lamp bracket and prevent lengthwise movement of said bumper-bracket relatively thereto.

5. An automobile bumper-bracket of the type adapted to derive its support in part from a lamp-and-fender-bracket having a lamp-post extending downwardly therefrom, said bumper-bracket comprising a plurality of members secured together in overlapping relation to embrace said post, one of said bracket members being offset to form a loop in said over-lapping portion, to receive said post, and a U-bolt arranged within said loop to straddle said fender bracket, and having a keeper-plate to sustain the weight of said bumper-bracket and bumper, said U-bolt having its legs threaded and provided with nuts to retain said keeper-plate in place, said loop having its upper edge notched to receive a portion of said lamp-bracket and present lengthwise movement of said bumper-bracket relatively thereto, and said bumper-bracket having an extension rearward to be connected with the chassis, and means to secure said extension to said chassis.

In witness whereof I have signed this specification.

OSCAR H. GOETZ.